US010591723B2

(12) United States Patent
Nahman et al.

(10) Patent No.: US 10,591,723 B2
(45) Date of Patent: Mar. 17, 2020

(54) IN-VEHICLE PROJECTION DISPLAY SYSTEM WITH DYNAMIC DISPLAY AREA

(71) Applicant: Harman International Industries, Incorporated, Stamford, CT (US)

(72) Inventors: Jaime Elliot Nahman, Oakland, CA (US); Stefan Marti, Oakland, CA (US); Davide Di Censo, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/541,468

(22) PCT Filed: Jan. 11, 2016

(86) PCT No.: PCT/US2016/012907
§ 371 (c)(1),
(2) Date: Jul. 3, 2017

(87) PCT Pub. No.: WO2016/115052
PCT Pub. Date: Jul. 21, 2016

(65) Prior Publication Data
US 2018/0011313 A1    Jan. 11, 2018

Related U.S. Application Data

(60) Provisional application No. 62/102,418, filed on Jan. 12, 2015.

(51) Int. Cl.
| G02B 27/01 | (2006.01) |
| B60K 35/00 | (2006.01) |
| B60K 37/02 | (2006.01) |

(52) U.S. Cl.
CPC .............. *G02B 27/01* (2013.01); *B60K 35/00* (2013.01); *B60K 37/02* (2013.01);
(Continued)

(58) Field of Classification Search
CPC ..... B60R 1/00; B60R 11/04; B60R 2300/205; B60R 2300/307; B60R 2300/8093; G02B 27/01; G02B 2027/014; G02B 2027/0138; G02B 2027/0181; G02B 2027/0183; G02B 2027/0187; G06K 9/00805; G06T 7/50;
(Continued)

(56) References Cited

U.S. PATENT DOCUMENTS

| 7,733,571 | B1 | 6/2010 | Li | |
| 9,703,372 | B2* | 7/2017 | Gall | ........................ B60K 35/00 |

(Continued)

OTHER PUBLICATIONS

International Search Report for Application No. PCPUS2016/012907, dated Apr. 15, 2016, 10 pages.

*Primary Examiner* — Christopher E Leiby
(74) *Attorney, Agent, or Firm* — Artegis Law Group, LLP

(57) ABSTRACT

The various embodiments set forth a method for displaying information on one or more surfaces of a vehicle, the method comprising acquiring position data associated with a driver of the vehicle, calculating a current field-of-view of the driver based on the position data, determining a suitable surface for displaying visual information within the vehicle based on the current field-of-view of the driver, and projecting an element of visual information on the suitable surface.

19 Claims, 5 Drawing Sheets

(52) U.S. Cl.
CPC .............. *B60K 2370/149* (2019.05); *B60K 2370/1529* (2019.05); *G02B 2027/014* (2013.01); *G02B 2027/0181* (2013.01); *G02B 2027/0183* (2013.01); *G02B 2027/0187* (2013.01)

(58) Field of Classification Search
CPC ............ G06T 7/70; G06T 2207/30261; G06T 2207/10016; G06T 2207/10028; G08G 1/166; B60K 35/00; B60K 2350/106; B60K 37/02
See application file for complete search history.

(56) References Cited

U.S. PATENT DOCUMENTS

| | | | |
|---|---|---|---|
| 2010/0321170 A1* | 12/2010 | Cooper | G02B 27/01 340/425.5 |
| 2011/0227717 A1 | 9/2011 | Kumon | |
| 2015/0097866 A1* | 4/2015 | Mochizuki | B60R 11/04 345/633 |
| 2015/0149079 A1* | 5/2015 | Breed | G01C 21/365 701/428 |
| 2015/0232030 A1* | 8/2015 | Bongwald | B60R 1/00 348/115 |
| 2015/0268466 A1* | 9/2015 | Kanamori | G02B 27/01 345/8 |
| 2017/0357099 A1* | 12/2017 | Last | G02B 27/2278 |

\* cited by examiner

IN-VEHICLE PROJECTION DISPLAY SYSTEM WITH DYNAMIC DISPLAY AREA

CROSS-REFERENCE TO RELATED APPLICATIONS

The present application is a national stage application of the international application titled, "IN-VEHICLE PROJECTION DISPLAY SYSTEM WITH DYNAMIC DISPLAY AREA," filed on Jan. 11, 2016 and having application number PCT/US2016/012907, This application claims the priority benefit of the U.S. Provisional Patent Application having Ser. No. 62/102,418, filed on Jan. 12, 2015. The subject matter of these related applications is hereby incorporated herein by reference.

BACKGROUND

Field of the Various Embodiments

The various embodiments relate generally to automotive design and, more specifically, to an in-vehicle projection display system with dynamic display area.

Description of the Related Art

Currently, to display visual information to the operator of a motor vehicle, such as navigation information, infotainment content, vehicle operating conditions, and the like, specialized devices are built into the instrument panel and center console of the vehicle. For example, gauges, dials, and other instruments provide engine conditions, fluid levels, warning lights, etc., while various display screens can provide navigation assistance and facilitate operation of an in-vehicle infotainment system.

However, to observe these instruments and display screens, the vehicle operator must look away from the road, which can be a distraction and pose risks. In addition, because the attention of the vehicle operator is typically focused outside the vehicle while the operator is driving the vehicle, urgent warning indicators that are located on the instrument panel or are displayed on a center console display screen can remain unnoticed for an extended period, which can be problematic. For example, failing to notice that the speed limit has been exceeded can be hazardous, and failing to notice that the engine oil light has been illuminated can result in serious engine damage.

Exacerbating the above issues is that fact that current implementations of in-vehicle display systems have relatively limited display surface areas because of limited space available on the dashboard center display console for in-vehicle displays. Other potential solutions, like adding instruments or in-vehicle displays to other surfaces within the vehicle that are easier for the vehicle operator to see, such as the vehicle interior or on the steering wheel airbag housing, are generally not practical. Further, while multi-functional infotainment display screens can effectively expand the amount of information displayed to the vehicle operator, to change the information displayed by such a screen requires navigation through a variety of menus, which is itself a potential major distraction for the vehicle operator.

Accordingly, what would be useful is a more effective way to provide visual information to a vehicle operator.

SUMMARY

The various embodiments set forth a method for displaying information on one or more surfaces of a vehicle, the method comprising acquiring position data associated with a driver of the vehicle, calculating a current field-of-view of the driver based on the position data, determining a suitable surface for displaying visual information within the vehicle based on the current field-of-view of the driver, and projecting an element of visual information on the suitable surface.

At least one advantage of the disclosed embodiments is that the method provides visual information that a vehicle operator can more easily view and interact with via a less distracting interface.

BRIEF DESCRIPTION OF THE SEVERAL VIEWS OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
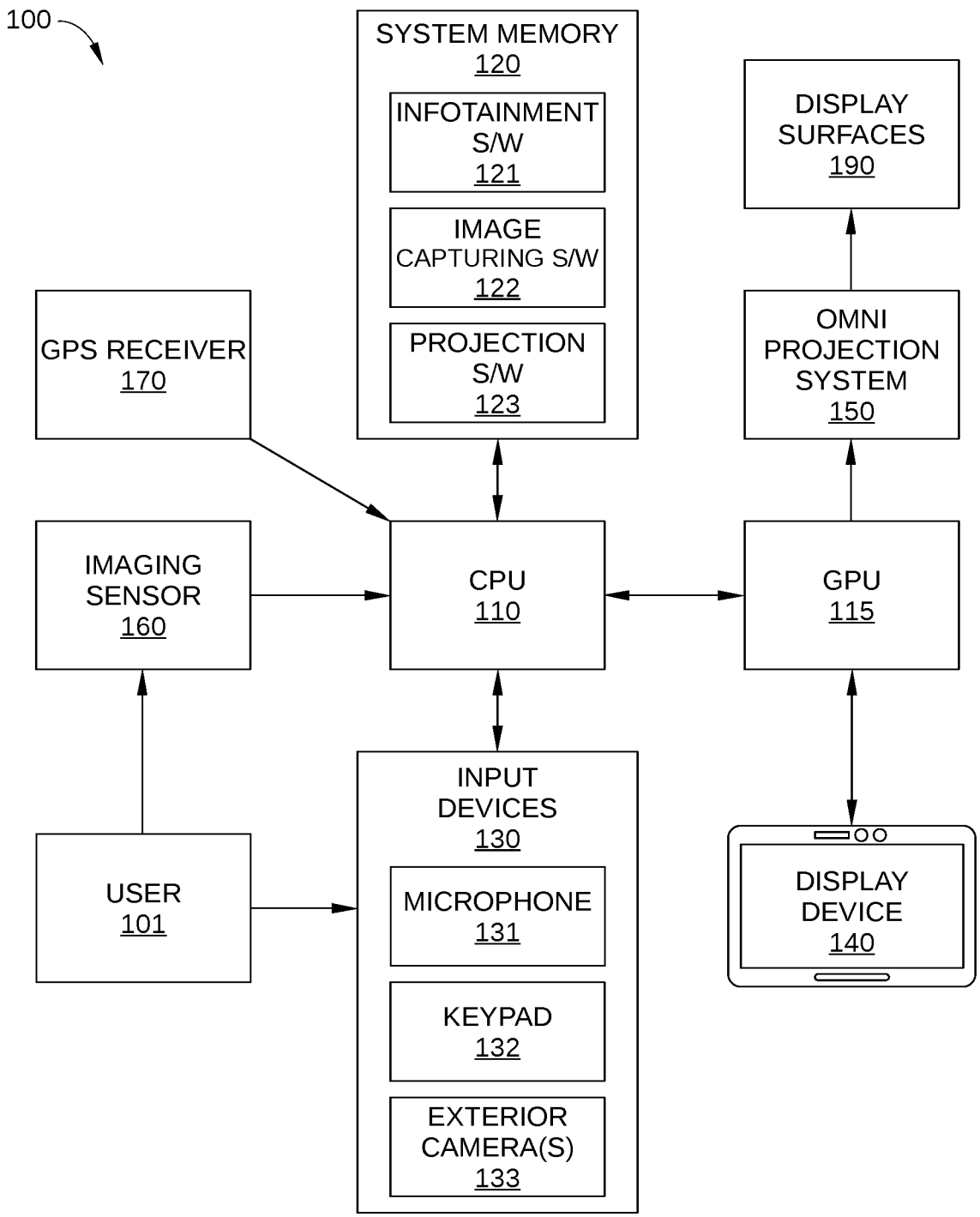
FIG. 1 is a block diagram illustrating a vehicular infotainment system that includes a projection display system, configured to implement one or more aspects of the various embodiments.

FIG. 1 is a block diagram illustrating a vehicular infotainment system 100 that includes a projection display system, configured to implement one or more aspects of the various embodiments. Vehicular infotainment system 100 may be any technically feasible in-vehicle infotainment (IVI) system associated with a particular vehicle, and may include, without limitation, audio and/or video players, a video game console, one or more display devices, voice-recognition software, and the like. In some embodiments, vehicular infotainment system 100 may be integrated in or include a head unit of an automotive stereo system, and may be configured as a subsystem of a vehicle control system associated with the vehicle and share computational resources therewith. In other embodiments, vehicular infotainment system 100 may be implemented as a stand-alone or add-on feature, part of the original equipment manufacturer (OEM) controls of the vehicle, or a combination of both.

In some embodiments, vehicular infotainment system 100 provides navigation information and other vehicle control information to a driver operating a vehicle. Specifically, for navigation, vehicular infotainment system 100 may be configured to accept input from a driver or other person (a "user" 101), including a destination location, to analyze road information, to calculate or determine one or more driving paths for the driver, to display such driving paths overlaid on a map, and to output associated driving instructions to the driver. Alternatively or additionally, vehicular infotainment system 100 may be configured to display controls to user 101 for controlling various equipment and devices within the vehicle. Such equipment and devices may include, without limitation, radio and other audio devices, multimedia players, wireless Internet devices, in-vehicle network devices, environmental control systems, cellular phone or other wireless communication devices, and the like. Vehicular infotainment system 100 may be further configured to display information and visual content pursuant to vehicle operation, including, without limitation, vehicle operating parameters (vehicle speed, current gear, battery voltage, engine temperature, cruise control settings, etc.), warning indicators (oil level, engine temperature, obstruction in the path of the vehicle or in a so-called "blind spot" of the vehicle operator, etc.), exterior camera video (rear camera, side camera, etc.), and the like.

According to various embodiments, vehicular infotainment system 100 includes a projection display system that employs omnidirectional projection techniques, in conjunction with eye gaze tracking, and/or face and head tracking, to display the above-described information on surfaces throughout the interior of a vehicle. Such a projection display system may be used in lieu of or in addition to conventional display screens and/or vehicle instrumentation, such as a center console infotainment screen, speedometer, tachometer, fuel gauge, etc. As such, in some embodiments, such a projection display system includes an omni-projection system 150, one or more imaging sensors 160, and one or more display surfaces 190, each of which are described below.

As shown, vehicular infotainment system 100 may include, without limitation, a central processing unit (CPU) 110, a graphics processing unit (GPU) 115, system memory 120, input devices 130, an information display device 140, an omni-projection system 150, one or more imaging sensors 160, and one or more display surfaces 190. In some embodiments, vehicular infotainment system 100 also includes a Global Navigation Satellite System (GNSS) receiver 170.

CPU 110 may be any suitable programmable processor implemented as a CPU, an application-specific integrated circuit (ASIC), a field programmable gate array (FPGA), any other type of processing unit, or a combination of different processing units. In general, CPU 110 may be any technically feasible hardware unit capable of processing data and/or executing software applications to facilitate operation of vehicular infotainment system 100 as described herein. GPU 115 may be any suitable programmable or fixed function processor that accepts commands and data from CPU 110 and generates images for display on information display device 140 and/or via omni-projection system 150.

System memory 120 generally includes, without limitation, storage chips, such as random access memory (RAM) chips, that store applications and data for processing by CPU 110. In some embodiments, system memory may include non-volatile memory such as optical drives, magnetic drives, flash drives, or other storage. System memory 120 stores, among other things, infotainment software 121, which includes, without limitation, software for controlling the different equipment and devices associated with infotainment system 110, as described above. In embodiments in which CPU 110 and/or GPU 115 are configured to control the output of omni-projection system 150, system memory 120 may also store image processing software 122 and projection software 123.

Image processing software 122 includes, without limitation, instructions that implement algorithms for capturing and analyzing images of user 101 with imaging sensor 160 and tracking eye gaze of user 101 and/or face or head orientation of user 101. Thus, in some embodiments, when user 101 changes the orientation of his or her head or face, image processing software 122 can, based on one or more images captured by imaging sensor 160, determine the new head or face orientation of user 101, and communicate this new head or face orientation to projection software 123 and/or omni-projection system 150. Similarly, when user 101 changes the direction of his or her eye gaze or the focus of his or her eyes, image processing software 122 can, based on one or more images captured by imaging sensor 160, determine the new eye gaze direction or point-of-focus of user 101, and communicate this new eye-gaze direction or point-of-focus information to projection software 123 and/or omni-projection system 150.

Alternatively or additionally, in some embodiments, image processing software 122 includes, without limitation, algorithms for analyzing images of user 101 captured by imaging sensor 160 and recognizing predetermined hand, finger, eye, and/or face gestures performed by user 101. Such algorithms are well-known in the art and can be readily implemented in vehicular infotainment system 100 by one of ordinary skill in the art. Thus, in such embodiments, when user 101 performs certain predetermined gestures, image processing software 122 can, based on one or more images captured by imaging sensor 160, determine the gesture or gestures performed by user 101, and communicate this gesture information to projection software 123. In such embodiments, projection software 123 may be configured to interpret gestural input received from image processing software 122 as one or more discrete commands from user 101 for controlling display device 140 (e.g., scrolling through menus, selecting particular displayed options, adjusting controllable features like sound volume, etc.), vehicle controls (e.g., cruise control settings, environmental settings, etc.), and/or any other components of vehicular infotainment system 100.

In some embodiments, image processing software 122 includes, without limitation, instructions for implementing an eye gaze tracker algorithm. In some embodiments, the eye gaze algorithm tracks the eye positions of user 101 to calculate a vector indicating the direction of the eye gaze of user 101, for example based on infrared light corneal reflection. In such embodiments, image processing software 122 can track real-time position of the eyes of user 101 as well as the direction of the eye gaze of user 101. Thus, in such embodiment, when user 101 changes the focus of his or her eyes and/or the direction of his or her eye gaze, image processing software 122 can, based on one or more images captured by imaging sensor 160, determine the direction of the eye gaze of user 101 and, therefore, an estimated field-of-view of user 101. The direction of the eye gaze of user 101 and/or the estimated field-of-view of user 101 are then communicated to CPU 110 and/or GPU 115 for use by projection software 123.

By way of example, face and eye gestures detectable by image processing software 122 may include, without limitation, short duration right or left eye winks, squints, log duration eye winks, raising of eyebrows, scrunching of the nose, pouting, lip curling, nasal flaring, and the like. The duration of any of such gestures may also be interpreted as a different gesture by image processing software 122, with a different end result when received by projection software 123. For example, a long duration squint or wink may be predetermined to indicate a scroll command when a menu of options is currently being displayed by omni-projection system 150. Head gestures detectable by image processing software 122 may include, without limitation, nodding, head shaking, sideways tilting of the head, and so on. Furthermore, the duration of such head gestures may indicate a different control input from user 101. In addition, combinations of face, eye, and head gestures may each be variously interpreted by image processing software 122 to indicate a discrete command being issued by user 101. In some embodiments, hand and/or finger gestures (pointing waving, etc.) may also be recognized by image processing software 122 as discrete commands for control of display device 150, vehicle controls, and the like.

Projection software 123 includes algorithms for determining the need to display specific visual information and the suitable display location of such visual information. In addition, projection software 123 may include algorithms for controlling the operation of omni-projection system 150. The need to display specific visual information may be based on a variety of factors, including, without limitation, a critical condition being met related to the operation of the vehicle, such as a low oil measurement, an obstruction in the path of the vehicle being detected, a low fuel level being detected, a dangerous lane position being detected, etc. Alternatively or additionally, the need to display specific visual information may be based on user input, including, without limitation, a hand, finger, face, or eye gesture (as detected by image processing software 122). Such gestures that are detectable by image processing software 122 are described above.

Alternatively or additionally, in some embodiments, the need to display specific visual information and the display location of said visual information may be based on the current orientation of the face or head of user 101. For example, projection software 123 may cause a visual indicator (such as a flashing arrow or other icon) to be displayed within the field of view of user 101 to direct the attention of user 101 to some target object outside the field of view of user 101. In such embodiments, the position of the visual indicator within the field of view of user 101 may be based on the current head or face orientation of user 101 as well as the position of the target object relative to the head or face of user 101.

In some embodiments, projection software 123 includes, without limitation, algorithms to determine which interior surfaces of the vehicle are suitable display areas, sized of those display areas, and slopes/curves of those display areas. This information can be used to calculate the keystoning of displayed visual information to compensate for sloping surfaces and project visual information that is not distorted when viewed by user 101. In addition, this information can be used to appropriately scale projected visual information, based on the distance of the display surface from omni-projection system 150.

In some embodiments, based on eye gaze direction information and/or a head or face orientation of user 101, as provided by image processing software 122, projection software 123 dynamically calculates a current field-of-view of user 101, and determines which display surfaces 190 are within that field-of-view. Projection software 123 then calculates size and position for each visual information element to be displayed to user 101, where size and position may be based not only on the geometry and location of display surfaces 190, but also on the importance or urgency of the visual information to be displayed.

Input devices 130 enable user 101 to provide input to vehicular infotainment system 100 and/or CPU 110. Thus, via user input devices 130, user 101 may select navigational targets, initiate telephone calls, and otherwise interact with vehicular infotainment system 100.

User input devices 130 may include, without limitation, one or more microphones 131, keypads 132, and/or exterior cameras. Microphone 131 enables voice-activated instructions to be received by vehicular infotainment system 100, while keypad 132 enables instructions to be entered via physical gestures on a touch-sensitive screen or actuation/depression of mechanical buttons. In some embodiments, keypad 132 may be configured as selectable alpha-numeric characters displayed on a touch-sensitive screen. In such embodiments, the selectable alpha-numeric characters may be displayed by information display device 140 or on a separate display device. Alternatively or additionally, keypad 132 may be configured with mechanical keys, such as a keyboard, or any other mechanical controller, such as a video gaming console. In some embodiments, one or more mechanical buttons of keypad 132 are located on the steering wheel of the vehicle or any other location separate from an alpha-numeric portion of the keyboard. For example, but without limitation, such separately located buttons may include on/off buttons, select buttons, mode change buttons, and the like. Exterior cameras 133 include one or more exterior view cameras, such as a back-up camera or a side-view/blind-spot camera, which can be used to enhance the visibility of user 101 during vehicle operation.

According to various embodiments, the functionality of one or more embodiments of keypad 132 may be included in visual information displayed onto one or more surfaces 190 by omni-projection system 150. For example, in addition to or in lieu of display device 140, vehicular infotainment system 100 may display visual information on surfaces 190, where some of the displayed information includes any technically feasible displayed buttons, drop-down menus, dials, and/or other combination indicator/selector elements that can be used to receive control inputs from user 101. Thus, in such embodiments, user 101 can interact with the displayed information not by depressing a mechanical button or rotating a selector dial on the dashboard, but instead by selecting a particular displayed button, selector dial, menu item, or the like. For example a particular predetermined eye, hand, face, or head gesture may be recognized by image processing software 122 and reported to projection software 123 as a user input.

Information display device 140 may be a video display screen configured to present video media to user 101, such as output from a back-up camera, navigation information, entertainment content, environmental control system information, etc. Information display device 140, along with one or more user input devices 130, may be integrated into a dashboard of the vehicle associated with vehicle infotainment system 100. In some embodiments, information display device 140 may not be incorporated into vehicle infotainment system 100, and may instead be a separate device. For example, and without limitation, information display device 140 may be a component of a stand-alone navigation system. In some embodiments, information display device 140 is configured with a touch-sensitive screen, and consequently may also be used as an input device by user 101. For example, and without limitation, in such embodiments, user 101 may make selections and/or enter data into vehicle infotainment system 100 via information display device 140. In some embodiments, information display device 140 may be configured with a user-adjustable mount to optimize viewing angle for a particular user, such as when information display device 140 is mounted on a motorcycle.

Omni-projection system 150 is configured to project visual information for user 101 onto display surfaces 190, where the visual information so displayed may be in addition to or in lieu of visual information presented to user 101 via other elements of vehicular infotainment system 100. Omni-projection system 150 may include, without limitation, any technically feasible omni-directional projection system that is configured to selectively project one or more images (video or static) at any of a plurality of locations within the interior of the vehicle associated with vehicular infotainment system 100. Thus, omni-projection system 150 can project a specified image (e.g., an engine warning indicator, speed indicator, etc.) to a specified location within the interior of the vehicle, as determined by projection software 123.

For example, in some embodiments, omni-projection system 150 includes, without limitation, one or more two-axis projectors mounted on the ceiling of the vehicle, where each of the one or more two-axis projectors is configured to rotate about two axes, thereby enabling panning and tilting of the two-axis projector. It is noted that such panning and tilting capability enables a two-axis projector to be directed toward most interior surfaces of the vehicle. In some embodiments, each of the one or more two-axis projectors includes a robotic platform that enables omni-projection system 150 to be pointed at any targeted surface in a vehicle via rotation about the panning and tilting axes. In embodiments in which omni-projection system 150 includes multiple two-axis projectors, or embodiments in which multiple omni-projection systems 150 are positioned in a single vehicle, each such projector or omni-projection system may be disposed in a different location in the vehicle, enabling projected images to be combined to produce larger images, and/or to increase the number of vehicle surfaces onto which visual information can be projected.

In addition, each of the one or more two-axis projectors includes, without limitation, a light engine for generating and projecting a specified image. In some embodiments, the light engine of the two-axis projector may include, without limitation, a scanning laser assembly for scanning laser light across a particular one of display surfaces 190, thereby producing a specified image for user 101. In such embodiments, the light engine may include a single laser or multiple lasers to generate the image. A single laser may be employed to generate a specified image that is mono-chromatic, or that is generated on a suitably treated surface, i.e., an "active" surface. An active surface is a surface that has been treated to include phosphor nano-particles that emit light when struck by light of a particular wavelength. In such embodiments, the active surface may be treated with three different types of phosphor nano-particles at different locations, so that an RGB image can be generated by suitable pulses of the single wavelength of scanning laser light as the scanning laser passes over the different types of phosphor nano-particles.

In embodiments in which the light engine includes multiple lasers to generate an image, each laser may emit a different wavelength of light, where the light emitted by each laser may be visible light (used to generate a specific image directly), or invisible light, such as UV light (used to generate a specific image by exciting phosphor nano-particles). In the case of visible light, each laser (for example a red laser, a green laser, and a blue laser) is scanned across the targeted display surface and suitably pulsed to produce red, green, and blue pixels, and thereby generate an image that is reflected off of the display surface. In the case of UV light, a different wavelength of UV light may be employed to excite different phosphor nano-particles and thereby generate different wavelengths of light at the active surface. Thus, to generate a full-color image for user 101, a laser that emits a first wavelength of UV light is directed to the specific locations in which red occurs in the image to be generated (for example via timed pulses as the laser is scanned across the display surface), and the nano-particles that react to that wavelength of UV light then emit red light. Similarly, a laser that emits a second wavelength of UV light is directed to the specific locations in which green occurs in the image to be generated, and a laser that emits a third wavelength of UV light is directed to the specific locations in which blue occurs in the image to be generated, so that green and blue pixels are also activated as needed in the image being generated. Such laser-scanning technology is well-known in the art, and can be readily implemented by one of skill in the art.

In some embodiments, the light engine of the two-axis projector may include, without limitation, a single light source and a digital light processing (DLP) or other micro-electromechanical systems (MEMS) mirror chip for generating a pixelated image on a specific display surface 190. The MEMS mirror chip can discretely direct light of a desired wavelength to specific pixel locations, thereby generating a full-color image. In such embodiments, the light engine of the two-axis projector may include three different light sources that generate timed pulses of a particular visible wavelength (such as red, green, or blue), or a single light source that is directed through a precisely timed rotating color wheel.

In either case, such MEMS chip technology is well-known in the art and can be readily implemented by one of skill in the art.

In addition to the above-described image projection devices, omni-projection system 150 may include any other technically feasible steerable image-projection technology suitable for use with vehicular infotainment system 100.

Imaging sensor 160 detects gestures performed by user 101 and/or the current eye focus of user 101. In some embodiments, imaging sensor 160 includes, without limitation, one or more digital cameras, positioned in the dashboard of the vehicle or elsewhere in the interior thereof. Imaging sensor 160 acquires images of user 101 and transmits such images to CPU 110 and/or GPU 115 for processing by image processing software 122. Thus, imaging sensors 160 can acquire the current body position of user 101 (such as a current eye gaze direction), gestures performed by user 101, and/or data that enables the determination of body position or gestures performed. In some embodiments, imaging sensor 160 includes, without limitation, one or more visible light and/or infrared sensors, ultrasonic sensors, radar-based sensors, laser-based sensors, thermal sensors, and/or depth sensors, such as time-of-flight sensors, structured light sensors, and the like. Multiple sensors may be employed to create a stable system that functions reliably in all lighting conditions. Generally, to track the eye gaze and/or head/face orientation of user 101, imaging sensors 160 may be used in conjunction with the above-described eye gaze tracker algorithm included in image processing software 122.

GNSS receiver 170 determines global position of the vehicle associated with vehicular infotainment system 100 based on one or more satellites, various electromagnetic spectrum signals (such as cellular tower signals, wireless Internet signals, radio tower signals, television transmitter signals, and the like), or other signals or measurements, or on a combination of the above items. In various embodiments, the infotainment software 121 accesses global positioning information from GNSS receiver 170 to determine a current location of the vehicle.

Display surfaces 190 may include any interior surfaces of the vehicle associated with vehicular infotainment system 100, including, without limitation, an interior surface of the windshield, side windows, dashboard, support structure for the roof, interior rear-view mirror, center console, steering wheel, arm rest, touch controller surfaces, vehicle doors, etc. In such embodiments, display surfaces 190 may include, without limitation, passive surfaces or active surfaces. Passive surfaces are surfaces of the interior of the vehicle that form a specified image by simply reflecting light incident thereon from the light engine of omni-projection system 150. Generally, passive surfaces provide enhanced image generation when white or light-colored. By contrast, active surfaces are surfaces of the interior of the vehicle that form a specified image by simply generating light when light is incident thereon from the light engine of omni-projection system 150. In such embodiments, the active surfaces may be treated with the above-described phosphor nano-particles, and the light used to excite these particles may be UV light of selected wavelengths. For example, transparent surfaces that are employed as display surfaces, such as the windshield or side windows, are generally active surfaces, since very little light from omni-projection system 150 can reflect back from a transparent surface. In some embodiments, display surfaces 190 include only active surfaces, in some embodiments only passive surfaces, and in some embodiments, a combination of both.

Figure 2:
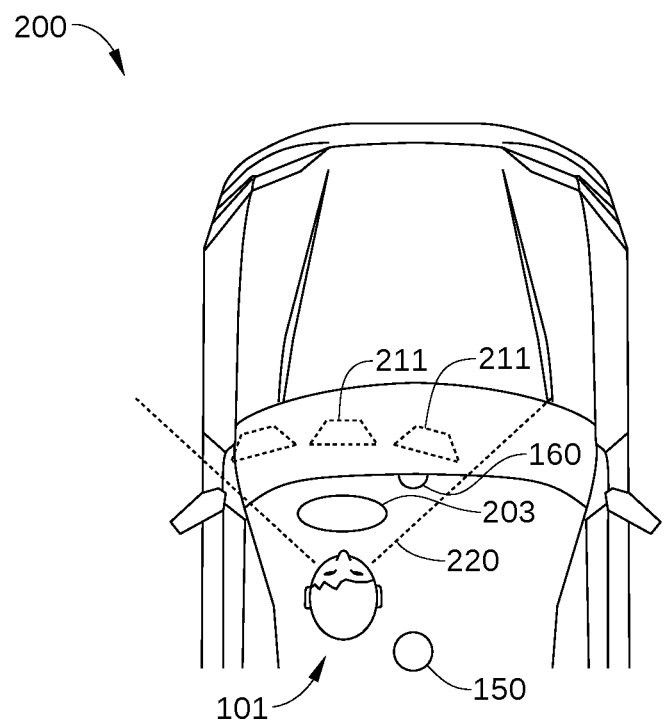
FIG. 2 is a schematic top view of a front portion of a motor vehicle that includes the vehicular infotainment system of FIG. 1, according to various embodiments.
Figure 3:
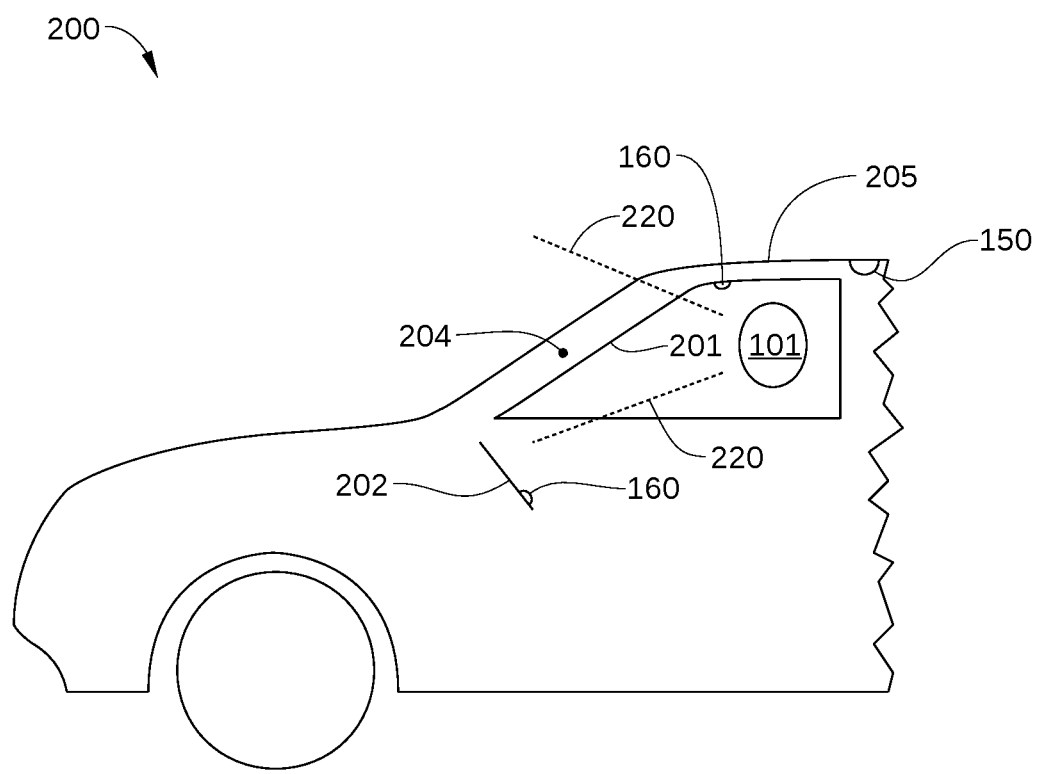
FIG. 3 is a schematic side view of the front portion of the motor vehicle of FIG. 2, according to various embodiments.

FIG. 2 is a schematic top view of a front portion of a motor vehicle 200 that includes the vehicular infotainment system of FIG. 1, according to various embodiments, and FIG. 3 is a schematic side view of the front portion of motor vehicle 200, according to various embodiments. As shown, omni-projection system 150 is positioned so that most or all interior surfaces of vehicle 200 can be employed as display surfaces, including, without limitation, windshield 201, dashboard 202, steering wheel 203, mullion posts 204, ceiling 205, and so on. For example, in the embodiment illustrated in FIGS. 2 and 3, omni-projection system 150 is mounted on ceiling 205 of motor vehicle 200.

In addition, one or more imaging sensors 160 are disposed within motor vehicle 200, for example on dashboard 202, mullion posts 204, and/or on ceiling 205. Imaging sensors are positioned to facilitate accurate imaging of user 101, including, without limitation, the eyes, face, head, hands, and body of user 101.

In the embodiment illustrated in FIGS. 2 and 3, only a single omni-projection system 150 is included in motor vehicle 200, but in other embodiments, multiple omni-projection systems 150 may be disposed within motor vehicle 200. In such embodiments, a first portion of displayed visual information may be generated with one omni-projection system 150 and a second portion of displayed visual information may be generated with the other omni-projection system 150.

Also shown in FIG. 2 are displayed visual information elements 211. Displayed visual information elements 211 are projected onto suitable interior surfaces of vehicle 200 to be within field-of-view 220 of user 101. In the embodiment illustrated in FIG. 2, displayed visual information elements 211 are illustrated projected onto windshield 201, dashboard 202, or a combination of both. Displayed information elements 211 may include, without limitation, vehicle operating indicators, such as a speedometer, a tachometer, and the like. In addition, when appropriate, displayed visual information elements 211 may include, without limitation, warning indicators, infotainment content, navigation content, etc.

In some embodiments, the positioning of each displayed visual information element 211 may be based on relative importance, so that more important or urgent information (e.g., current speed, oil low warning indicator, etc.) is located closer to the center of field-of-view 220, whereas less urgent or important information (e.g., odometer reading, infotainment information, etc.) is located further from the center of field-of-view 220. In some embodiments, the relative size and/or color of each displayed visual information element 211 may be based on relative importance, so that more important or urgent information is larger and/or a particular color (e.g., red), whereas less urgent or important information is smaller and/or a different color (e.g., green).

Figure 4:
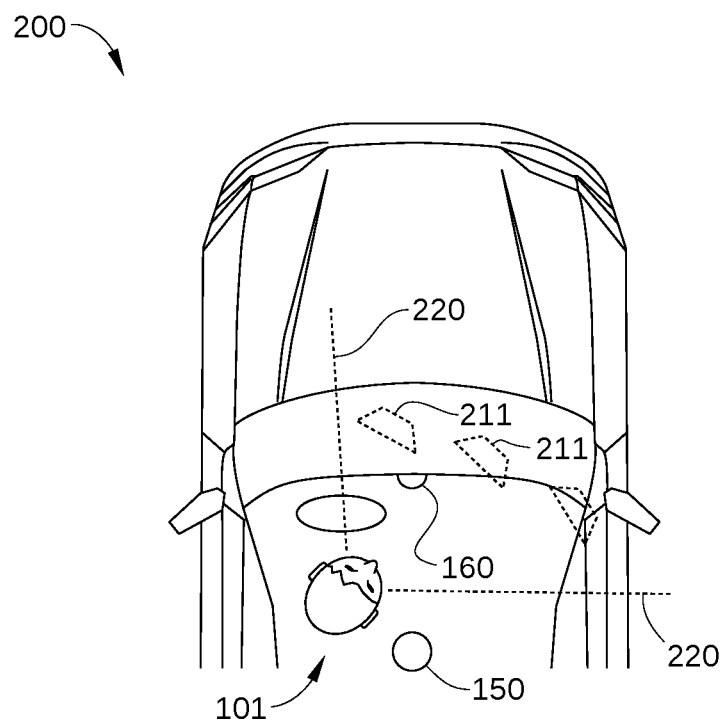
FIG. 4 is a schematic top view of a front portion of a motor vehicle that includes the vehicular infotainment system of FIG. 1, according to other various embodiments.

FIG. 4 is a schematic top view of a front portion of a motor vehicle 200 that includes the vehicular infotainment system of FIG. 1, according to various embodiments. As shown, in FIG. 4, user 101 has turned to the right, which changes field-of-view 220 accordingly. Because image processing software 122 detects this change, either via eye-tracking or head/face orientation algorithms, projection software 123 controls omni-directional projection system 150 to project displayed visual elements 211 on surfaces within vehicle 200 that are within field-of-view 220.

More specific use cases are now described. Persons skilled in the art will understand that these use cases are exemplary in nature only and do not, and are not meant to, limit the scope of the various embodiments in any way.

Use Case 1

User 101 is driving and is looking through windshield 201. Around the periphery of field-of-view 220, user 101 can see dashboard 202, mullion posts 204, and ceiling 205. On these surfaces, omni-projection system 150 displays important contextual information, such as a speedometer, navigation details, current radio station, and the like. During the drive, a phone call is received. Of the displayed visual elements 211, other contextual information fades and is replaced by two symbols for answering or hanging up a phone. User 101 simply looks at the answer icon and winks to select that icon. The two icons then disappear and displayed visual elements 211 associated with a new application related to the telephone call appear. When user 101 completes the call, user 101 looks at a displayed visual element 211 representing the call application, and winks to hang up, and any displayed visual element 211 associated with the call application disappears. Other displayed visual elements 211 may return to the previous state and location in field-of-view 220.

Use Case 2

User 101 is driving to a work meeting at an office he or she has never been to. User 101 pulls up navigation directions via vehicular infotainment system 100. Once user 101 does this, a map and visual navigation instructions are added to the displayed visual elements 211 currently visible, for example on surfaces of dashboard 202 or the air bag housing on steering wheel 203. As user 101 drives, the map and turn-by-turn navigation instructions are updated. When a turn is imminent, other displayed visual elements 211 fade while the navigation instructions and map display grow and move toward the middle of field-of-view 220. After user 101 has completed the turn, the navigation map and instructions return to a normal size and location, and the remaining displayed visual elements 211 are restored and resized.

Use Case 3

User 101 is listening to music on a phone before entering vehicle 200. Once in vehicle 200, the phone syncs with the vehicular infotainment system 100, playing music wirelessly through the car speakers. Omni-projection system 150 adds the music screen of the phone as an additional window being displayed on dashboard 220. User 101 can now control the music application on the phone through eye gaze gestures directed at the displayed visual element 211 associated with the music screen of the phone.

Use Case 4

User 101 is driving with omni-projected information displayed on dashboard 202 and on other opaque surfaces of vehicle 220, and decides to change lanes. As user 101 turns his or her head to the right to look into the side mirror and check the right-hand blind spot, displayed visual elements 211 move with the head turn, repositioning as needed to remain in field-of-view 220. Thus, some or all of displayed visual elements are then displayed on dashboard 202, right mullion post 204, and the right-hand side door of vehicle 200. Also, in one embodiment, one of displayed visual elements 211 may be a projected window displaying the view from a forward facing camera, so that user 101 can see traffic in front of vehicle 200 even though field-of-view 220 is directed towards the right side of vehicle 200. As user 101 completes the lane change and turns his or her head back towards windshield 201, displayed visual elements 211 follow this head movement and return to a normal position and size.

Figure 5:
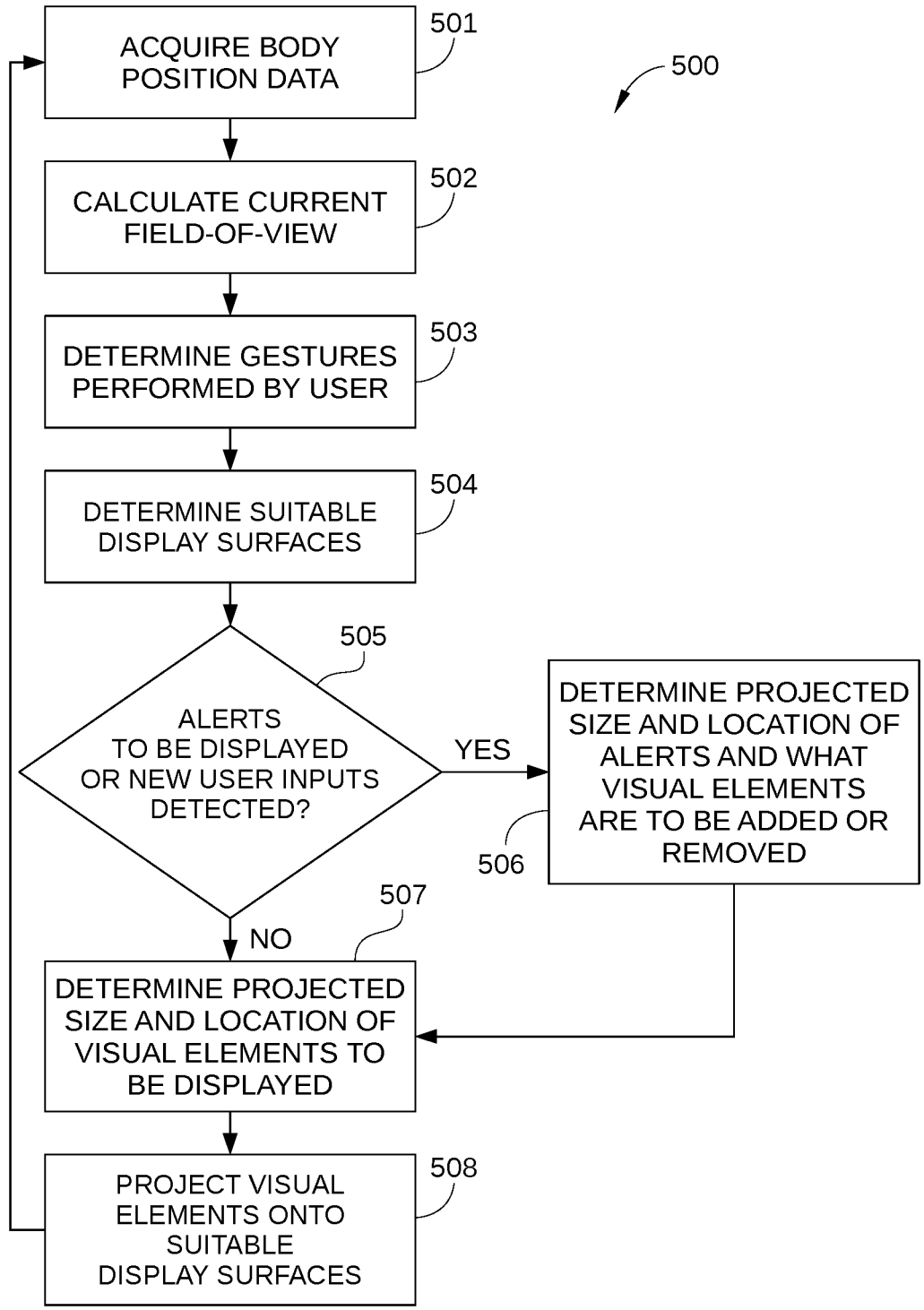
FIG. 5 sets forth a flowchart of method steps for displaying visual information in a motor vehicle, according to the various embodiments.

FIG. 5 sets forth a flowchart of method steps for displaying visual information in a motor vehicle, according to the various embodiments. Although the method steps are described with respect to the systems of FIGS. 1-4, persons skilled in the art will understand that any system configured to perform the method steps, in any order, falls within the scope of the various embodiments.

As shown, a method 500 begins at step 501, in which image processing software 122 acquires body position data associated with user 101. The body position data acquired in step 501 may include, without limitation, head or face orientation and location, eye information related to gaze direction, facial gestures, eye gestures, and the like.

In step 502, image processing software 122 calculates the current field-of-view 220 of user 101, based on the body position data acquired in step 501. In some embodiments, image processing software 122 first calculates eye gaze direction, and the current field-of-view 220 is calculated based thereon. In other embodiments, image processing software 122 determines the current field-of-view 220 based on face and/or head orientation and position.

In step 503, image processing software 122 determines, based on one or more images recently acquired of user 101, what gesture or gestures have been performed by user 101, such as an eye-wink, head nod, etc.

In step 504, based on the current field-of-view 220 calculated in step 502, suitable display surfaces are determined by projection software 123. In some embodiments, the suitability of interior surfaces of vehicle 200 as display surfaces 190 may be based on angle of inclination, distance from user 101, presence or absence of a suitable treatment (e.g., phosphor nano-particles) or surface color, among other factors.

In step 505, projection software 123 determines whether there are currently any alerts to be displayed or if new user inputs have been received. Alerts may be any urgent information to be displayed to user 101, such as an indicator of a condition that is best addressed by user 101 as soon as possible. Examples of alerts include, without limitation, an impending turn recommended by a navigation system, a low-oil warning, an impending lane-position violation, a fuel low warning, an excess speed warning, a warning of an obstruction in the path of vehicle 200, and the like. User inputs may be received via mechanical interfaces, such as keypad 132, or via gestures performed by user 101 and determined in step 503. If projection software 123 determines that an alert is to be displayed or a new user input has been received, method 500 proceeds to step 506; if not, method 500 proceeds directly to step 507.

In step 506, projection software 123 determines a projected size and position of displayed visual elements 211 that correspond to alerts to be displayed. In addition, projection software 123 determines, based on user inputs recognized in step 505, what new displayed visual elements 211 are to be displayed and what current displayed visual elements 211 are to be removed. For example, selection made by user 101 via gestures or mechanical input devices may change what displayed visual elements 211 should be displayed. Method 500 then proceeds to step 507.

In step 507, projection software 123 determines a projected size and position of displayed visual elements 211. In embodiments in which one or more alerts are to be displayed, the projected size and position of other displayed visual elements 211 are changed accordingly, so that the alerts occupy the appropriately prominent location in field-of-view 220. In embodiments in which one or more user inputs have been received, displayed visual elements 211 are added or removed based on the one or more user inputs, and the projected size and position of currently displayed visual elements 211 are changed to accommodate the new or removed displayed visual elements 211.

In step 508, projection software 123 causes omni-projection system 150 to project the displayed visual elements 211 onto one or more of display surfaces 190. Method 500 then proceeds back to step 501.

In sum, various embodiments set forth a display system that uses omnidirectional projection techniques, eye gaze tracking, and/or head and face tracking to display information on any suitable surface in a motor vehicle, including appropriately treated transparent surfaces. Advantageously, the display system can provide visual information to a driver regardless of where the driver is currently directing his or her gaze. Another advantage is that, by making more display area available for a driver, more information can be presented. A further advantage is that, unlike a conventional static instrument panel, the display system can provide different information and/or more prominently display certain information as conditions change during operation. Yet another advantage is that interaction with navigation and other infotainment systems can be completely hands-free and does not require the driver to turn away from the direction of travel, even when driving in a curve or when backing up.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The claimed invention is:

1. A method for displaying information on one or more surfaces of a vehicle, the method comprising:
   acquiring position data associated with a user of the vehicle;
   calculating a current field-of-view of the user based on the position data;
   selecting a first surface of the vehicle from among a plurality of surfaces of the vehicle that are each capable of displaying visual information within the vehicle based on the current field-of-view of the user;
   projecting an specified image on the selected first surface of the vehicle;
   while projecting the specified image on the selected first surface of the vehicle, determining that the current field-of-view of the user has changed to a new field-of-view that includes a second surface of the vehicle included in the plurality of surfaces of the vehicle, wherein the second surface is different from the first surface; and
   in response, moving the specified image from the first surface to the second surface.

2. The method of claim 1, further comprising determining a size of the specified image when projected on the selected first surface.

3. The method of claim 2, wherein determining the size is based on whether the specified image indicates that a critical condition related to operation of the vehicle has been satisfied.

4. The method of claim 2, wherein determining the size is based on a relative importance of first visual information associated with the specified image compared to second visual information associated with an additional specified image to be displayed.

5. The method of claim 2, wherein determining the size of the specified image when projected on the selected first surface is based on a distance between the user and the selected first surface.

6. The method of claim 1, wherein projecting the specified image comprises directing visible light onto the selected first surface.

7. The method of claim 1, wherein projecting the specified image comprises directing ultraviolet light of a first wavelength onto the selected first surface.

8. A system for displaying information on one or more surfaces of a vehicle, the system comprising:
   at least one imaging sensor configured to acquire user body, position data;
   at least one projector configured to project an image onto the one or more surfaces of the vehicle based on the position data associated with a user of the vehicle;
   a memory that stores image processing software and image projection software;
   at least one processor that is coupled to the memory and, when executing the image processing software and the image projection software, is configured to: acquire the position data from the at least one imaging sensor, calculate a current field-of-view of the user based on the position data, select a first surface of the vehicle from among a plurality of surfaces of the vehicle that are each capable of displaying visual information within the vehicle based on the current field-of-view of the user;

transmit one or more instructions to the at least one projector to project an specified image on the selected first surface of the vehicle;

while the at least one projector projects the specified image on the selected first surface of the vehicle, determine that the current field-of-view of the user has changed to a new field-of-view that includes a second surface of the vehicle included in the plurality of surfaces of the vehicle, wherein the second surface is different from the first surface; and in response, transmit one or more instructions to the at least one projector to move the specified image from the first surface to the second surface.

9. The system of claim 8, wherein the processor selects the first surface by selecting an interior surface of the vehicle that is disposed within the current field-of-view of the user.

10. The system of claim 9, wherein the selected first surface comprises a surface treated with phosphor nanoparticles that are excited by a first wavelength.

11. The system of claim 9, wherein the processor is further configured to determine a size of the specified image when projected on the selected first surface.

12. The system of claim 11, wherein the processor determines the size based on whether the specified image indicates that a critical condition related to operation of the vehicle has been satisfied.

13. The system of claim 11, wherein the processor determines the size based on a relative importance of first visual information associated with the specified image compared to second visual information associated with an additional specified image to be displayed.

14. One or more non-transitory computer readable media storing instructions that, when executed by one or more processors, configure the one or more processors to perform the steps of:

acquiring position data associated with a user of the vehicle;

calculating a current field-of-view of the user based on the position data;

selecting a first surface of the vehicle from among a plurality of surfaces of the vehicle that are each capable of displaying visual information within the vehicle based on the current field-of-view of the user;

projecting an specified image on the selected first surface of the vehicle;

while projecting the specified image on the selected first surface of the vehicle, determining that the current field-of-view of the user has changed to a new field-of-view that includes a second surface of the vehicle included in the plurality of surfaces of the vehicle, wherein the second surface is different from the first surface; and in response, moving the specified image from the first surface to the second surface.

15. The one or more none or more on-transitory computer readable media of claim 14, further comprising determining a size of the specified image when projected on the selected first surface.

16. The one or more none or more on-transitory computer readable media of claim 15, wherein determining the size is based on whether the specified image indicates that a critical condition related to operation of the vehicle has been satisfied.

17. The one or more none or more on-transitory computer readable media of claim 15, wherein determining the size is based on a relative importance of first visual information associated with the specified image compared to second visual information associated with an additional specified image to be displayed.

18. The one or more none or more on-transitory computer readable media of claim 14, further comprising determining that a gesture has been performed by the user of the vehicle based on the position data associated with a body of the user.

19. The one or more none or more on-transitory computer readable media of claim 18, further comprising, based on the gesture, performing an input operation for an infotainment system associated with the vehicle.

* * * * *